(12) United States Patent
Hus et al.

(10) Patent No.: US 11,813,784 B2
(45) Date of Patent: Nov. 14, 2023

(54) DEVICE FOR STARTING AN EXTRUSION PROCESS

(71) Applicant: battenfeld-cincinnati Germany GmbH, Bad Oeynhausen (DE)

(72) Inventors: Tobias Hus, Luebbecke (DE); Carsten Deppe, Kempen (DE)

(73) Assignee: BATTENFELD-CINCINNATI GERMANY GMBH, Bad Oeynhausen (DE)

( * ) Notice: Subject to any disclaimer, the term of this patent is extended or adjusted under 35 U.S.C. 154(b) by 0 days.

(21) Appl. No.: 17/797,442

(22) PCT Filed: Feb. 1, 2021

(86) PCT No.: PCT/EP2021/052242
§ 371 (c)(1),
(2) Date: Aug. 4, 2022

(87) PCT Pub. No.: WO2021/160449
PCT Pub. Date: Aug. 19, 2021

(65) Prior Publication Data
US 2023/0075322 A1    Mar. 9, 2023

(30) Foreign Application Priority Data
Feb. 12, 2020   (DE) ............... 10 2020 103 687.6

(51) Int. Cl.
*B29C 48/25* (2019.01)
*B29C 48/92* (2019.01)
*B29C 48/09* (2019.01)

(52) U.S. Cl.
CPC ............ *B29C 48/269* (2019.02); *B29C 48/09* (2019.02); *B29C 48/92* (2019.02); *B29C 2948/92076* (2019.02); *B29C 2948/92447* (2019.02)

(58) Field of Classification Search
CPC ......... B29C 48/09; B29C 48/10; B29C 48/11; B29C 48/12; B29C 48/13; B29C 48/901;
(Continued)

(56) References Cited

U.S. PATENT DOCUMENTS 4,386,628 A * 6/1983 Stanley ............... F16L 55/1651
138/140
4,490,316 A * 12/1984 Satzler ................ B29C 48/0016
264/171.27
(Continued)

FOREIGN PATENT DOCUMENTS

DE      1094977 B       12/1960
DE      20221671 U1     11/2006
DE      20221671 U1 *   12/2006 ......... B29C 47/0023

Primary Examiner — Seyed Masoud Malekzadeh
(74) Attorney, Agent, or Firm — LEYDIG, VOIT & MAYER LTD.

(57) ABSTRACT

An apparatus for starting an extrusion process, including at least a drawing device having a main frame, a platform arranged on the main frame, a cable winch arranged on the platform and having a drum, and a wire cable that can be wound up on the drum of the cable winch and pulls an extruded plastics pipe in an extrusion line by way of deflection rolls until the pipe is taken over by a take-off device, wherein the platform is movable transversely to an extrusion direction.

12 Claims, 4 Drawing Sheets

(58) Field of Classification Search
CPC . B29C 48/902; B29C 48/903; B29C 48/9115; B29C 48/912; B29C 48/9125; B29C 48/913; B29C 2948/92428; B29C 2948/92923; B29C 2948/92523; B29C 2948/92533; B29C 2948/92028; B29C 2948/92038

See application file for complete search history.

(56) References Cited

U.S. PATENT DOCUMENTS

| | | | | |
|---|---|---|---|---|
| 4,529,564 | A * | 7/1985 | Harlow | B29C 48/885 |
| | | | | 264/288.8 |
| 4,640,313 | A * | 2/1987 | Stanley | B29C 48/21 |
| | | | | 156/244.14 |
| 5,102,584 | A * | 4/1992 | Paivinen | G02B 6/4484 |
| | | | | 57/7 |
| 5,239,813 | A * | 8/1993 | Baumgarten | H01B 13/14 |
| | | | | 57/295 |
| 5,403,120 | A * | 4/1995 | Stekette, Jr. | B29C 53/10 |
| | | | | 405/184.2 |
| 6,368,547 | B1 | 4/2002 | Visscher | |
| 7,168,934 | B2 * | 1/2007 | Jung | H01B 13/14 |
| | | | | 425/114 |
| 2003/0141617 | A1 * | 7/2003 | Prevotat | B29C 55/26 |
| | | | | 425/141 |
| 2006/0202381 | A1 * | 9/2006 | Bach | B29C 48/09 |
| | | | | 264/40.6 |
| 2014/0239530 | A1 * | 8/2014 | Dohmann | B29C 48/919 |
| | | | | 264/40.6 |

* cited by examiner

DEVICE FOR STARTING AN EXTRUSION PROCESS

CROSS REFERENCE TO RELATED APPLICATIONS

This application is a U.S. National Phase application under 35 U.S.C. § 371 of International Application No. PCT/EP2021/052242, filed on Feb. 1, 2021, and claims benefit to German Patent Application No. DE 10 2020 103 687.6, filed on Feb. 12, 2020. The International Application was published in German on Aug. 19, 2021 as WO 2021/160449 A1 under PCT Article 21(2).

FIELD

The invention relates to an apparatus for starting an extrusion process.

BACKGROUND

Nowadays, in relatively large take-off devices as used in the extrusion of large pipes, a cable winch is generally used as a start-up aid to start the extrusion process. The cable winch is often secured on the top of the main frame of the take-off device in order to save space in the customer's production facility. The wire cable then reaches the extrusion line via deflection rolls and pulls the pipe through the individual system components until it reaches the take-off device.

The winch therefore has to satisfy the following criteria:
A suitable tensile force of several tons is needed.
The winch should pull the pipe through the system at a constant speed so that the pipe that has just been started becomes a salable product.
The winch is usually configured for single layers. In multi-layer winches, the speed would be altered with each switch from one position to the next since the diameter of the winding—and thus the peripheral speed—changes. This change is sudden, difficult to detect, and even more difficult to compensate for.
While the wire cable is being wound up onto the drum, the angle between the cable and the extrusion axis should not be too large; experience has shown that a value of 3° to 4° should not be exceeded, otherwise the cable may jump out of the guide on the drum, which may again result in undesirable speed changes. In addition, non-negligible lateral forces are exerted on the deflection rolls if the angles are relatively large.

To pull the pipe through all the system components present, a particular wire cable length is needed. If a relatively long cable is used in conjunction with a relatively wide drum and the same drum diameter, the above-mentioned angle would be too large. Therefore, a critical factor here is that the angular range might not be adhered to if the drum were widened but the diameter kept the same. In consideration of said criteria, the only option for being able to use a relatively long cable is to increase the diameter of the drum. This has the following drawbacks:
The drum has a high inherent weight, so the main frame has to be reinforced.
A larger, more powerful drive has to be used since the cable is wound up at a relatively great distance from the center of rotation (longer lever arm means higher torque).
The production costs are greater for the larger drum.

The manufacturing costs are significantly higher for the winch as a whole.
DE 20 221 671 U1 discloses an apparatus for starting an extrusion process using a cable winch. However, this specification does not go into more detail on the working principle and configuration thereof.

SUMMARY

In an embodiment, the present disclosure provides an apparatus for starting an extrusion process, comprising at least a drawing device having a main frame, a platform arranged on the main frame, a cable winch arranged on the platform and having a drum, and a wire cable that can be wound up on the drum of the cable winch and pulls an extruded plastics pipe in an extrusion line by way of deflection rolls until the pipe is taken over by a take-off device, wherein the platform is movable transversely to an extrusion direction.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present disclosure provides winches and uses thereof such that a compact, inexpensive winch can be used even without having to increase the diameter of the winch for greater cable lengths.

In an embodiment, an apparatus is provided for starting an extrusion process comprising at least one drawing device having a main frame, a platform arranged on the main frame, a cable winch arranged on the platform and having a drum, and a wire cable that can be wound up on the drum of the cable winch and pulls an extruded plastics pipe in an extrusion line by way of deflection rolls until said pipe is taken over by a take-off device.

In an embodiment, the present disclosure provides a platform that is movable transversely to the extrusion direction.

In this way, the cable winch can always be positioned such that the maximum permitted angle is not exceeded. The cable winch can thus still wind in a single layer, even when the drum diameter is small. Since the distance between the cable and the center of rotation of the drum is smaller, the drive has to apply less torque and can be made more compact. Even if there is no synchronization between the rotational speed of the cable winch and the speed of the cross adjustment, the angle can still be set within the stated range. There is no need to set and maintain an exact angle value.

According to an embodiment, the platform is arranged on linear guides and moved by means of motor-driven spindles.

Advantageously, the angle between the wire cable and the extrusion axis is monitored. This can be done using a camera or also using sensors. If a deviation from the specifications is detected, this is counteracted by means of the machine controller. For example, this can be done by increasing the speed of the transversely moving winch. An angle from 2° to 8° from the extrusion axis, in any direction, is considered to be a deviation. Ideally, the angle is kept between 3° and 4° from the extrusion axis. Other angular ranges between 2° and 8°, such as 5° or 6°, are also conceivable.

Figure 1:
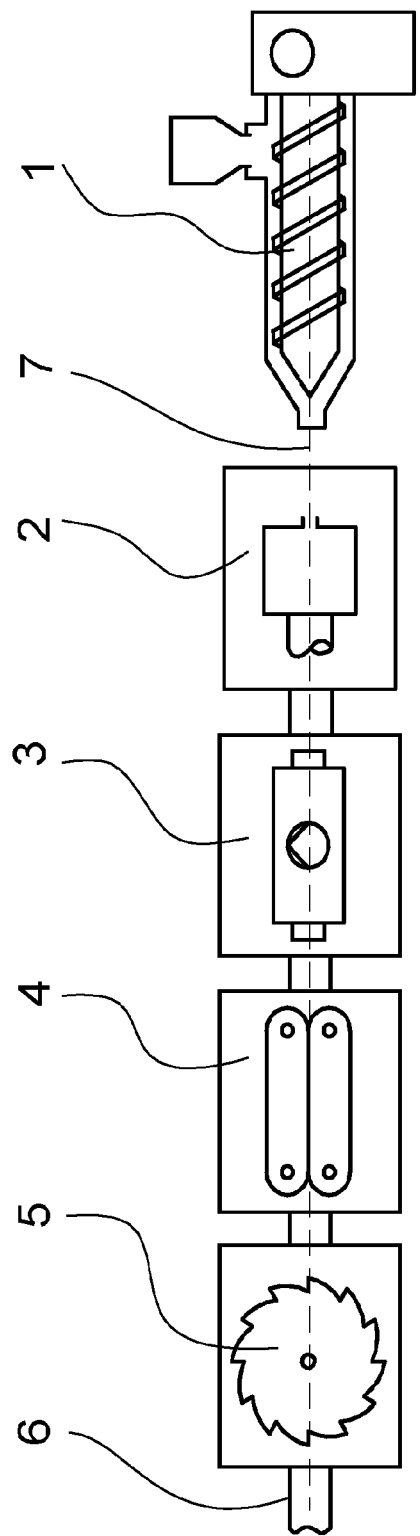
FIG. 1 shows an extrusion line.

FIG. 1 shows an extrusion line, as used nowadays for profile extrusion, be it for the production of window profiles or pipes. It shows an extruder 1 in which plastics material is melted and continuously fed into the extrusion die 2 for shaping. Following said extruder is a calibration and cooling station 3; depending on the profile, additional cooling stations may be inserted. A drawing device 4 follows the cooling stations. To cut the continuous profiles 6 to the desired length, a cutting device 5 is arranged thereafter. The extrusion axis is denoted by reference sign 7.

Figure 2:
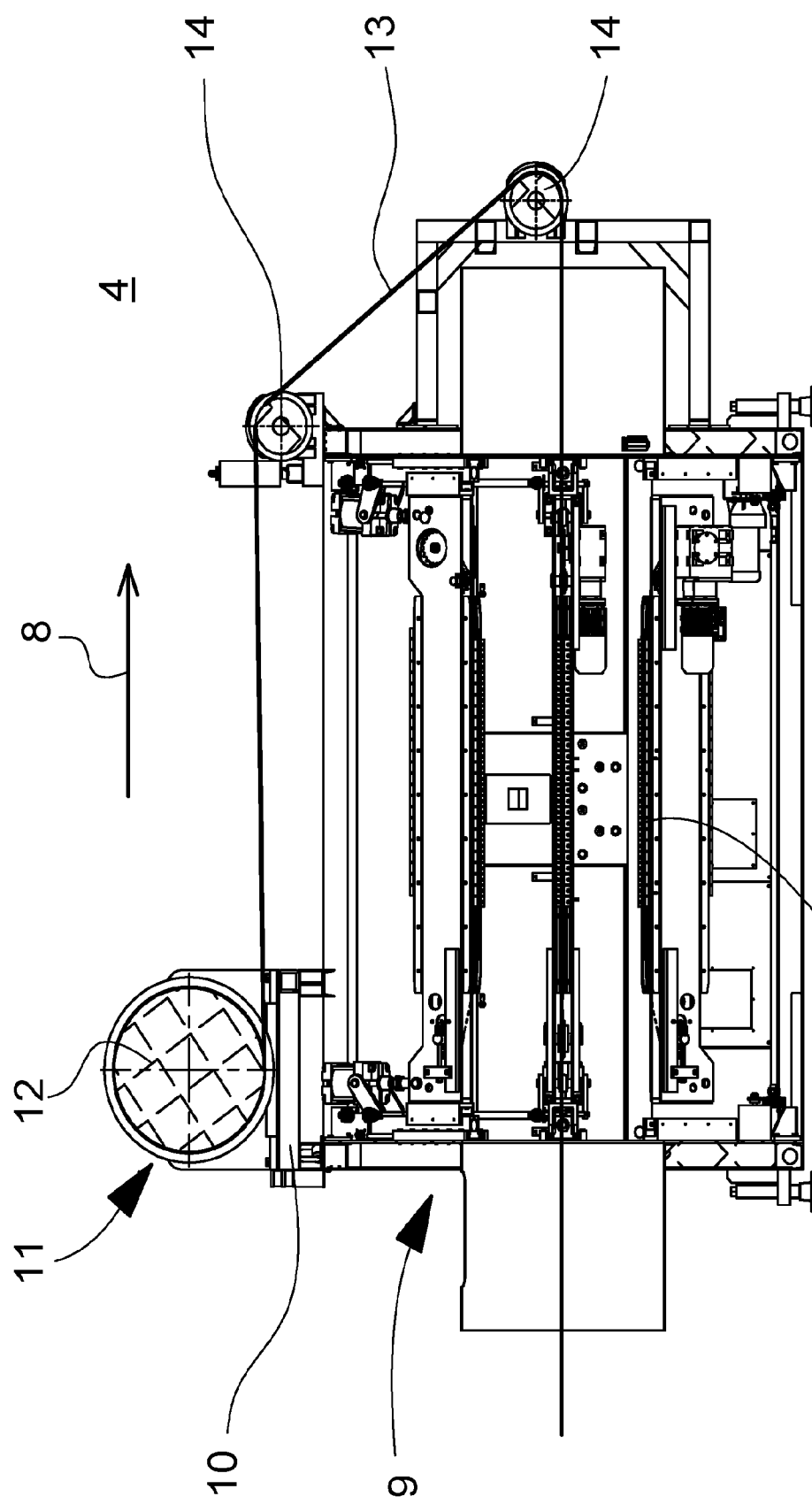
FIG. 2 is a side view of a drawing device.

FIG. 2 is a side view of the drawing device 4. The extrusion direction is indicated by reference sign 8. Among other things, the drawing device 4 comprises a main frame 9 on which a platform 10 is arranged. A cable winch 11 having a drum 12, onto which a wire cable 13 is wound, is mounted on the platform 10. The wire cable 13 is guided via deflection rolls 14 and can thus pull a plastics pipe through the extrusion line until the pipe is taken over by the take-off device 15.

Figure 3:
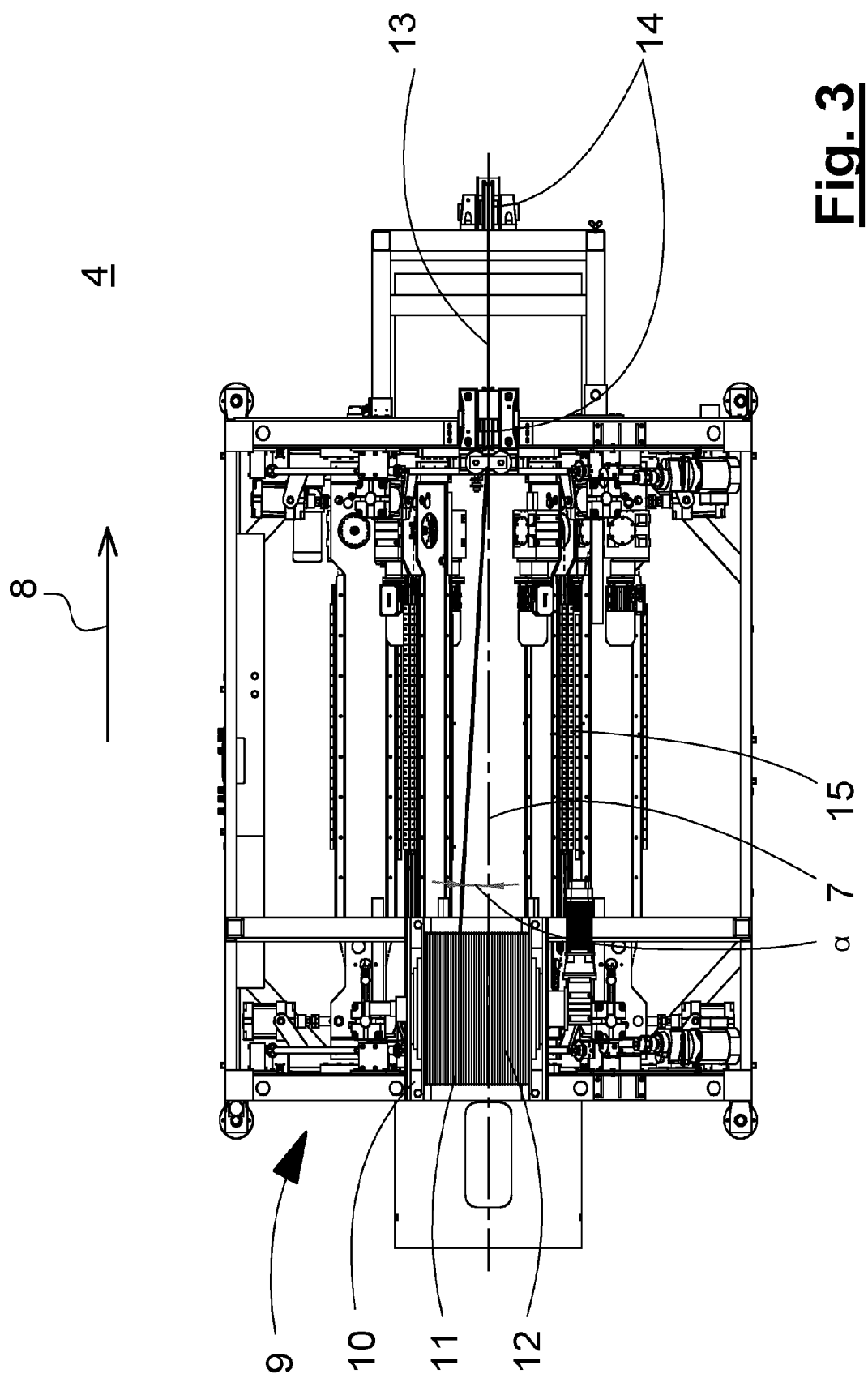
FIG. 3 is a plan view of a drawing device.

FIG. 3 is a plan view of the same drawing device 4. In this figure too, the extrusion direction is again denoted by 8. The wire cable 13 wound up over the drum 12 by means of the cable winch 11 is guided via deflection rolls 14. The cable winch 11 is arranged on a platform 10 that is movable transversely to the extrusion axis 7. The angle α formed between the wire cable 13 and the extrusion axis 7 thus does not exceed a predetermined maximum, and the risk of the wire cable 13 overlapping or of the wire cable coming off the drum 12 can thus be avoided. In the ideal scenario, the angle α stays at 0°, i.e., the wire cable 13 is thus always positioned in a plane that is perpendicular to the extrusion axis 7. If the angle α of the wire cable 13 deviates from this plane by more than 3° to 4°, this is counteracted by the transverse movement of the platform 10. Depending on the size of the drum 12 used, the angular range before transverse movement becomes necessary may also be larger. A range from 2° to 8° is monitored, but this can also be from 3° to 5° or therebetween.

The platform 10 is arranged on linear guides and can be moved transversely by means of a motor-driven spindle to the extrusion direction, for example, in a direction orthogonal to the extrusion direction.

Figure 4:
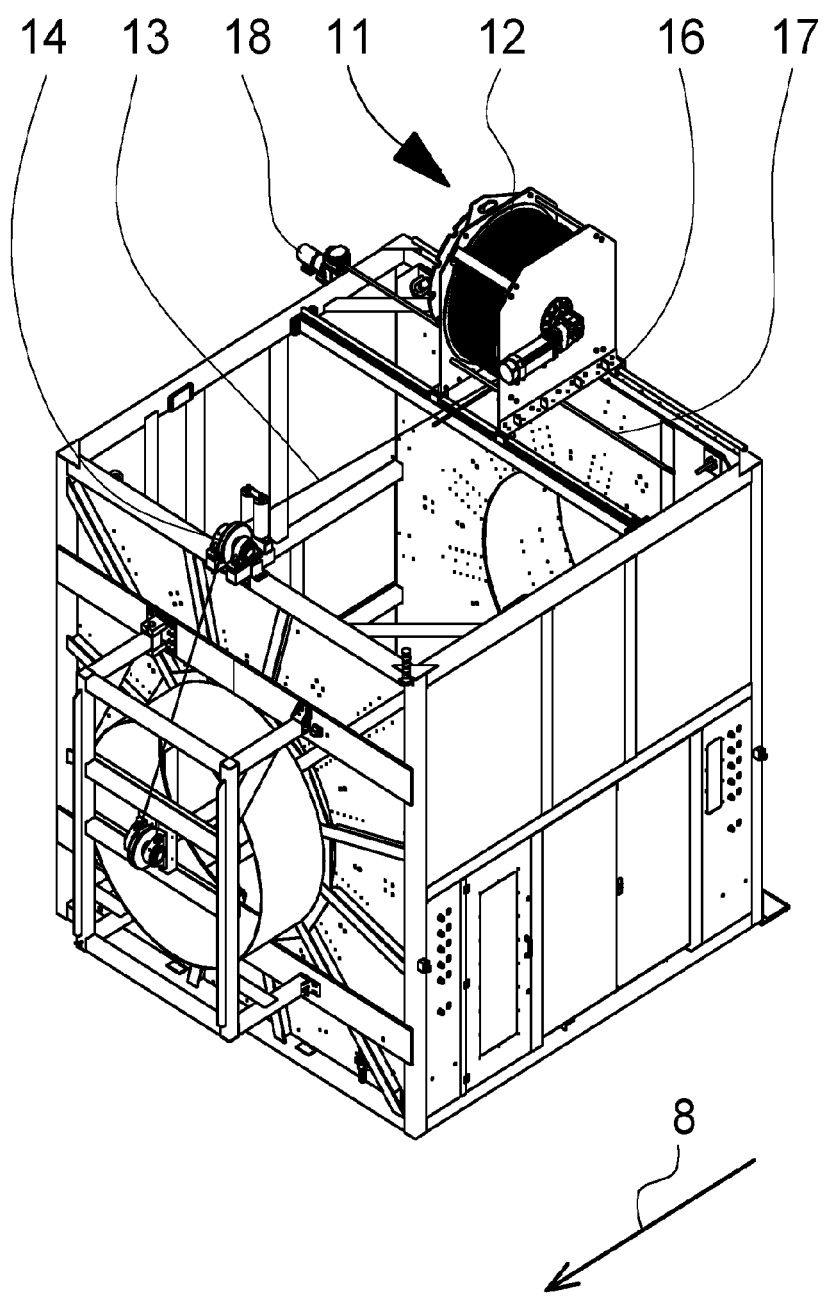
FIG. 4 is a 3D illustration of a take-off device.

FIG. 4 is a 3D view of the drawing device. The extrusion direction is again denoted by 8. The wire cable 13 reaches the plastics pipe via the deflection rolls 14. The cable winch 11 together with the drum 12 can be moved transversely by means of the platform. The guide 16, in conjunction with the spindle 17, which is operated in a motorized manner by way of the drive 18, is used for this purpose.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Extruder
2 Extrusion die
3 Calibration and cooling tank
4 Drawing device
5 Cutting device
6 Profile
7 Extrusion axis
8 Extrusion direction
9 Main frame
10 Platform
11 Cable winch
12 Drum
13 Wire cable
14 Deflection roll
15 Take-off device
16 Linear guide
17 Motor-driven spindle
18 Drive of 17
α Angle between 13 and 7

The invention claimed is:

1. An apparatus for starting an extrusion process, comprising at least:
 a drawing device having a main frame and including deflection rolls;
 a platform arranged on the main frame;
 a cable winch arranged on the platform and having a drum; and
 a wire cable that can be wound up on the drum of the cable winch and pulls an extruded plastics pipe in an extrusion line by way of the deflection rolls until the pipe is taken over by a take-off device,
 wherein
 the platform is configured to move in a transverse direction orthogonal to an extrusion direction.

2. The apparatus according to claim 1, wherein the platform is arranged on linear guides and is moved by a motor-driven spindle.

3. The apparatus according to claim 1, wherein the apparatus is configured to monitor an angle α between the wire cable and an extrusion axis.

4. The apparatus according to claim 3, wherein a camera is configured to monitor the angle α.

5. The apparatus according to claim 3, wherein sensors that detect an angular deviation are configured to monitor the angle α.

6. The apparatus according to claim 3, wherein the platform is configured to counteract the angle α by movement of the platform transverse to the extrusion direction.

7. The apparatus according to claim 3, wherein the platform is arranged above the extrusion axis.

8. The apparatus according to claim 7, wherein the deflection rolls include a first deflection roll and a second deflection roll arranged above the extrusion axis.

9. The apparatus according to claim 8, wherein the second deflection roll is arranged at an offset above the extrusion axis, the offset being equal to a radius of the second deflection roll at which the second deflection roll is configured to receive the wire cable.

10. The apparatus according to claim 8, wherein the second deflection roll is configured to arrange the wire cable in the extrusion direction.

11. The apparatus according to claim 2, wherein the linear guides extend across a width of the drawing device.

12. An apparatus for starting an extrusion process, comprising at least:
- a drawing device having a main frame and including deflection rolls;
- a platform arranged on the main frame;
- a cable winch arranged on the platform and having a drum; and
- a wire cable that can be wound up on the drum of the cable winch and pulls an extruded plastics pipe in an extrusion line by way of the deflection rolls until the pipe is taken over by a take-off device, wherein the platform is movable transversely to an extrusion direction, wherein the apparatus is configured to monitor an angle α between the wire cable and an extrusion axis, and wherein the platform is configured to counteract the angle α by movement of the platform transverse to the extrusion direction.

* * * * *